United States Patent
Zheng et al.

(10) Patent No.: US 7,899,421 B2
(45) Date of Patent: *Mar. 1, 2011

(54) DOUBLE SEARCH ALGORITHM OF USER GROUP SELECTION FOR MULTIUSER MIMO DOWNLINK TRANSMISSION

(75) Inventors: Jun Zheng, La Jolla, CA (US);
Chengjin Zhang, La Jolla, CA (US);
Severine Catreux-Erceg, Cardiff, CA (US); Vinko Erceg, Cardiff, CA (US);
Pieter Roux, San Diego, CA (US);
Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1191 days.

This patent is subject to a terminal disclaimer.

(21) Appl. No.: 11/231,501

(22) Filed: Sep. 21, 2005

(65) Prior Publication Data
US 2007/0066225 A1   Mar. 22, 2007

(51) Int. Cl.
*H04B 1/18* (2006.01)
(52) U.S. Cl. .................... 455/166.2; 455/62; 455/115.3; 455/509; 455/513; 370/334
(58) Field of Classification Search ............. 455/62, 455/115.3, 166.2, 509, 513; 370/334
See application file for complete search history.

(56) References Cited

U.S. PATENT DOCUMENTS

| 7,110,378 B2 * | 9/2006 | Onggosanusi et al. ....... 370/334 |
| 2005/0101259 A1 * | 5/2005 | Tong et al. ..................... 455/69 |
| 2005/0265223 A1 * | 12/2005 | Song ............................ 370/208 |

FOREIGN PATENT DOCUMENTS

| EP | 1505741 B2 | 2/2005 |
| WO | WO 2005060123 B2 | 6/2006 |

OTHER PUBLICATIONS

Behrouz Farhang-Boroujeny et al., Layering techniques for space-time communication in multi-user networks; Vehicular Technology Conference, 2003. VTC-2003 IEEE 58th Orlando, FL, USA Oct. 6-9, 2003, Piscataway, NJ, USA, IEEE, US Oct. 6, 2003; pp. 1339-1343 vol. 2, XP010700858, ISBN:0-7803-7954-3.*

E. Telatar, "Capacity of Multi-antenna Gaussian Channels," Bell Labs Technical Journal, Jun. 1995.

(Continued)

*Primary Examiner* — Tuan H Nguyen
(74) *Attorney, Agent, or Firm* — McAndrews, Held & Malloy, Ltd.

(57) ABSTRACT

A method and system for a double search algorithm of user group selection for multiuser MIMO downlink transmission are provided. The use of optimal brute-force user group selection may require high computational expense. A first search operation may be based on a first user having a channel gain greater than that of other users, while a second search operation may be based on a second user having a channel gain greater than that of the remaining users. A maximized system capacity may be determined based on the maximized system capacities determined in the first and second search loop. A receiver pair associated with the maximized system capacity may be selected as the user group. The double search algorithm may reduce the computational complexity while achieving performances that may exceed the TDMA scheme and be similar to that of systems with ideal CSI at the transmitter.

22 Claims, 7 Drawing Sheets

OTHER PUBLICATIONS

G. J. Foschini, "Layered Space-Time Architecture for Wireless Communication in a Fading Environment when Using Multi-Element Antennas," Bell Labs Technical Journal, vol. 1, No. 2, pp. 41-59, 1996.

S. Caire, G. Shamai, "On the Achievable Throughput of a Multiantenna Gaussian Broadcast Channel," IEEE Trans. on Information Theory, vol. 49, No. 7, pp. 1691-1706, 2003.

C. B. Peel, B. M. Hochwald, and A. L. Swindlehurst, "A Vector-Perturbation Technique for Near-Capacity Multiantenna Multiuser Communication—Part I: Channel Inversion and Regularization," IEEE Trans. on Communications, vol. 53, No. 1, pp. 195-202, Jan. 2005.

C. Windpassinger, R. F. H. Fischer, T. Vencel, and J. B. Huber, "Precoding in Multiantenna and Multiuser Communications," IEEE Trans. on Wireless Communications, vol. 3, No. 4, pp. 1305-1316, Jul. 2004.

B..M. Hochwald, C. B. Peel, and A. L. Swindlehurst, "A Vector-Perturbation Technique for Near-Capacity Multiantenna Multiuser Communication—Part I: Perturbation," IEEE Trans. on Communications, vol. 53, No. 3, pp. 537-544, Mar. 2005.

T. Yoo and A. J. Goldsmith, "Optimality of Zero-Forcing Beamforming with Multiuser Diversity," in *2005 IEEE International Conference on Communications*, Seoul, Korea, May 2005, pp. 542-546.

T. K. Y. Lo, "Maximum Ratio Transmission," IEEE Trans. on Communications, vol. 47, No. 10, pp. 1458-1461, Oct. 1999.

Farhang-Boroujeny B et al; "Layering techniques for space-time communication in multi-user networks"; Vehicular Technology Conference, 2003. VTC-2003-FALL. 2003 IEEE 58th Orlando, FL, USA Oct. 6-9, 2003, Piscataway, NJ, USA, IEEE, US Oct. 6, 2003; pp. 1339-1343vol. 2, XP010700858, ISBN: 0-7803-7954-3.

\* cited by examiner

DOUBLE SEARCH ALGORITHM OF USER GROUP SELECTION FOR MULTIUSER MIMO DOWNLINK TRANSMISSION

CROSS-REFERENCE TO RELATED APPLICATIONS/INCORPORATION BY REFERENCE

This application makes reference to:
U.S. application Ser. No. 11/232,340 filed Sep. 21, 2005;
U.S. application Ser. No. 11/232,266 filed Sep. 21, 2005;
U.S. application Ser. No. 11/231,699 filed Sep. 21, 2005;
U.S. application Ser. No. 11/231,586 filed Sep. 21, 2005;
U.S. application Ser. No. 11/232,369 filed Sep. 21, 2005;
U.S. application Ser. No. 11/231,701 filed Sep. 21, 2005;
U.S. application Ser. No. 11/232,362 filed Sep. 21, 2005;
U.S. application Ser. No. 11/231,557 filed Sep. 21, 2005; and
U.S. application Ser. No. 11/231,416 filed Sep. 21, 2005.

Each of the above stated applications is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of signals in communication systems. More specifically, certain embodiments of the invention relate to a double search algorithm for user group selection for multiuser multiple-input-multiple-output (MIMO) downlink transmission.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to increase the degrees of freedom to suppress interference generated within the signal reception process. Diversity gains improve system performance by increasing received signal-to-noise ratio and by stabilizing the transmission link. On the other hand, more degrees of freedom may allow multiple transmissions that may provide more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some initial work on multiple antenna systems may be focused on systems that support single user point-to-point links. However, the use of multi-antenna techniques for a multiuser environment to improve total throughput remains a challenge.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a double search algorithm for user group selection for multiuser multiple-input-multiple-output (MIMO) downlink transmission, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for a double search algorithm for user group selection for multiuser multiple-input-multiple-output (MIMO) downlink transmission. In accordance with various embodiments of the invention, the double search algorithm may reduce the computational complexity typically associated with optimal brute-force user group selection while achieving performances that may exceed the TDMA scheme and be on par with systems having ideal channel state information (CSI) at the transmitter. The double search algorithm may comprise a first search operation that may be based on a first user having a channel gain greater than that of other users and a second search operation that may be based on a second user having a channel gain greater than that of the remaining users. A maximized system capacity may be determined based on the maximized system capacities determined in the first and second search loop. A receiver pair associated with the maximized system capacity may be selected as the user group.

In a multiuser communication system, employing multiple antennas at the base station may improve the downlink system capacity. Communicating simultaneously to multiple users through precoding at the transmitter when channel state information (CSI) is available may result in capacity improvement. Zero-forcing (ZF) linear precoding combined with an optimal user group selection algorithm may be utilized to asymptotically achieve the sum capacity when the number of users, K, approaches infinity. Furthermore, ZF precoders with that utilize a brute-force search algorithm may, in some instances, provide near-optimal performance even with a limited number of users, such as K=10, for example. Utilizing zero-forcing precoding in a multiuser environment may provide improvements to future broadband wireless data communication systems with reduced computational complexity as compared to optimal brute-force user group selection algorithms.

Figure 1A:
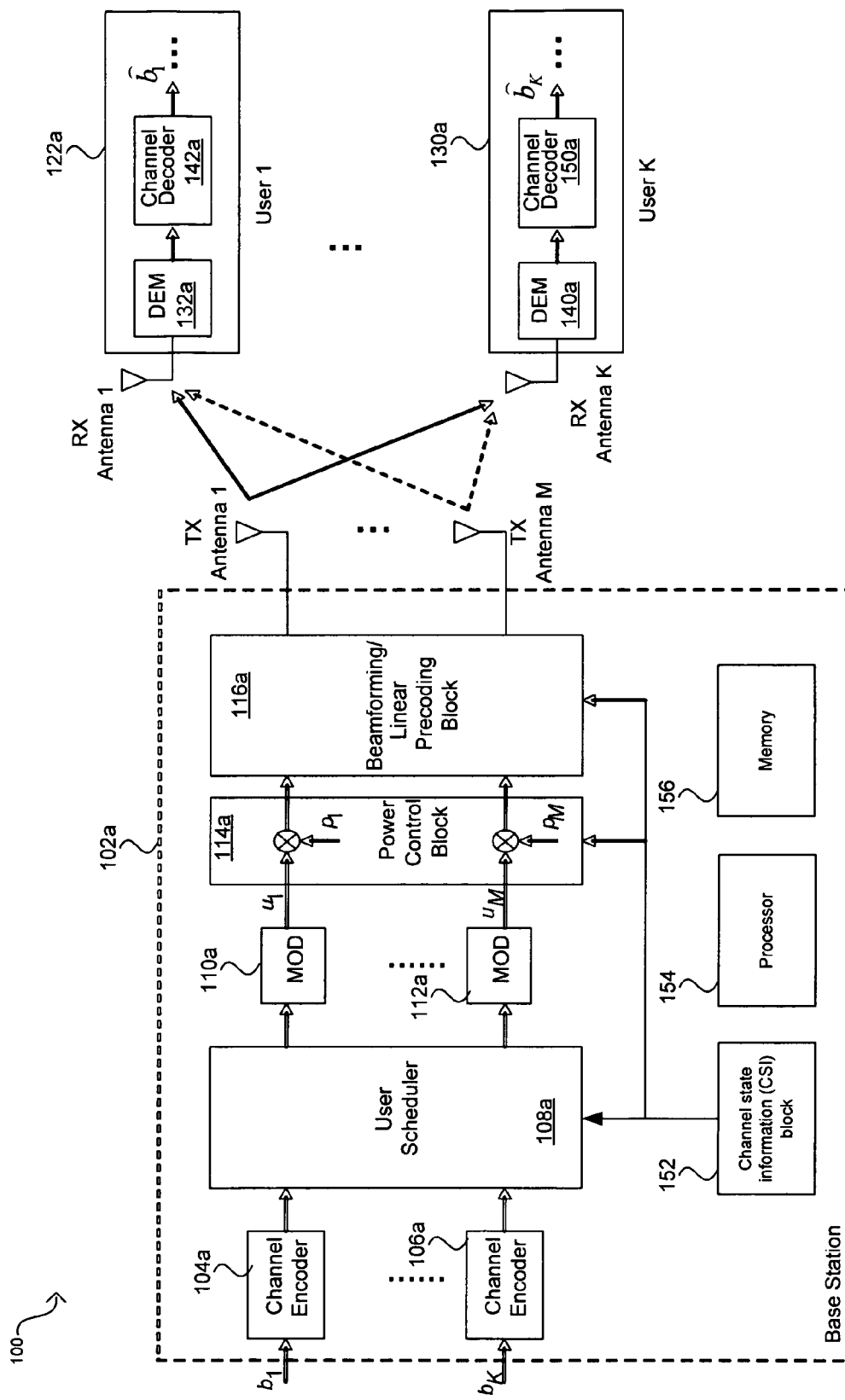
FIG. 1A is a top-level block diagram illustrating an exemplary multiuser multiple-input-multiple-output (MIMO) downlink transmission system with linear precoding, in accordance with an embodiment of the invention.

FIG. 1A is a top-level block diagram illustrating an exemplary multiuser multiple-input-multiple-output (MIMO) downlink transmission system with linear precoding, in accordance with an embodiment of the invention. Referring to FIG. 1A, there is shown a communication system 100 that may comprise a base station 102a and a plurality of users 122a, ..., 130a. In the communication system 100, the base station 102a may be equipped with M antennas and K users 122a, ..., 130a may each have a single antenna. In this implementation, the total number of users or receiver antennas may be equal or higher than the number of base station antennas, that is, $K \leq M$.

The base station 102a may comprise a plurality of channel encoders 104a, ..., 106a, a user scheduler 108a, a plurality of modulators (MOD) 110a, ..., 112a, a power control block 114a, a beamforming or linear precoding block 116a, a channel state information (CSI) block 152, a processor 154, and a memory 156. Each of the plurality of users 122a, ..., 130a may comprise one of a plurality of demodulators (DEM) 132a, ..., 140a, and one of a plurality of channel decoders 142a, ..., 150a.

The channel encoders 104a, ..., 106a may comprise suitable logic, circuitry, and/or code that may be adapted to encode binary data for each of the K users in the communication system 100. The beamforming or linear precoding block 116a may comprise suitable logic, circuitry, and/or code that may be adapted to processes the user data symbols to separate signals intended for different users such that each of the users receive little or no interference from other users. With M antennas at the base station 102a, the beamforming or linear precoding block 116a may separate at most M different signals, that is, the base station 102a may transmit to at most M users at a time. Therefore, for each channel realization, the base station 102a may need to select M or less than M users among all the K users to transmit.

The user scheduler 108a may comprise suitable logic, circuitry, and/or code that may be adapted to find a best user group that optimizes certain performance criterion such as the sum throughput of the system, for example. In this regard, the user scheduler 108a may be adapted to perform the steps of a double search user selection algorithm to find the best user group. The user scheduler 108a may utilize knowledge of the channel estate information (CSI) provided by the CSI block 152 when determining the best user group. The user scheduler 108a may be adapted to select a first user with the strongest channel gain and a second user with the second strongest channel gain. The user scheduler 108a may be adapted to determine a first maximum system capacity based on the first user and a second maximum system capacity based on the second user. The user scheduler 108a may also be adapted to select the highest of the first maximum system capacity and the second maximum system capacity as the maximum system capacity to be supported by the communication system 100. The system capacity may refer to the transmit data rate between the base station 102a and at least one user selected from the K users. The first maximum system capacity and the second maximum system capacity may be based on transmit data rate to a chosen group of users, for example, a pair of users. In this regard, for a case when M=2, the user scheduler 108a may select a user group comprising a pair of users associated with the maximum system capacity selected.

The modulators 110a, ..., 112a may comprise suitable logic, circuitry, and/or code that may be adapted to modulate the binary data of each of the users selected by the user scheduler 108a. In this regard, the modulation operation on the binary data may result in a plurality of complex symbols, for example. The power control block 114a may comprise suitable logic, circuitry, and/or code that may be adapted to allocate different users with different power levels in accordance with their respective channel quality, for example.

The user scheduler 108a, the power control block 114a, and/or the beamforming or linear precoding block 116 may require knowledge of the state of the downlink channel. The CSI block 152 may comprise suitable logic, circuitry, and/or code that may be adapted to receive, store and/or transfer channel state information associated with the users 122a, ..., 130a. In this regard, the CSI block 152 may be adapted to transfer the channel state information to the user scheduler 108a, the power control block 114a, and/or the beamforming or linear precoding block 116 when necessary.

The processor 154 may comprise suitable logic, circuitry, and/or code that may be adapted to process information and/or data associated with the generation of transmission signals at the base station 102a. The processor 154 may also be adapted to control at least a portion of the operations of the base station 102a such as the channel encoders 104a, ..., 106a, the user scheduler 108a, the modulators (MOD) 110a, ..., 112a, the power control block 114a, the beamforming or linear precoding block 116a, the CSI block 152, and/or the memory 156. The memory 156 may comprise suitable logic, circuitry, and/or code that may be adapted to store data and/or control information that may be utilized in the operation of at least a portion of the base station 102a.

The demodulators 132a, ..., 140a in the users 122a, ..., 130a may comprise suitable logic, circuitry, and/or code that may be adapted to demodulate the signals received from the base station 102a, for example. The channel decoders 142a, ..., 150a may comprise suitable logic, circuitry, and/or code that may be adapted to decode the demodulated signals from the demodulators 132a, ..., 140a into binary bit streams, for example.

Figure 1B:
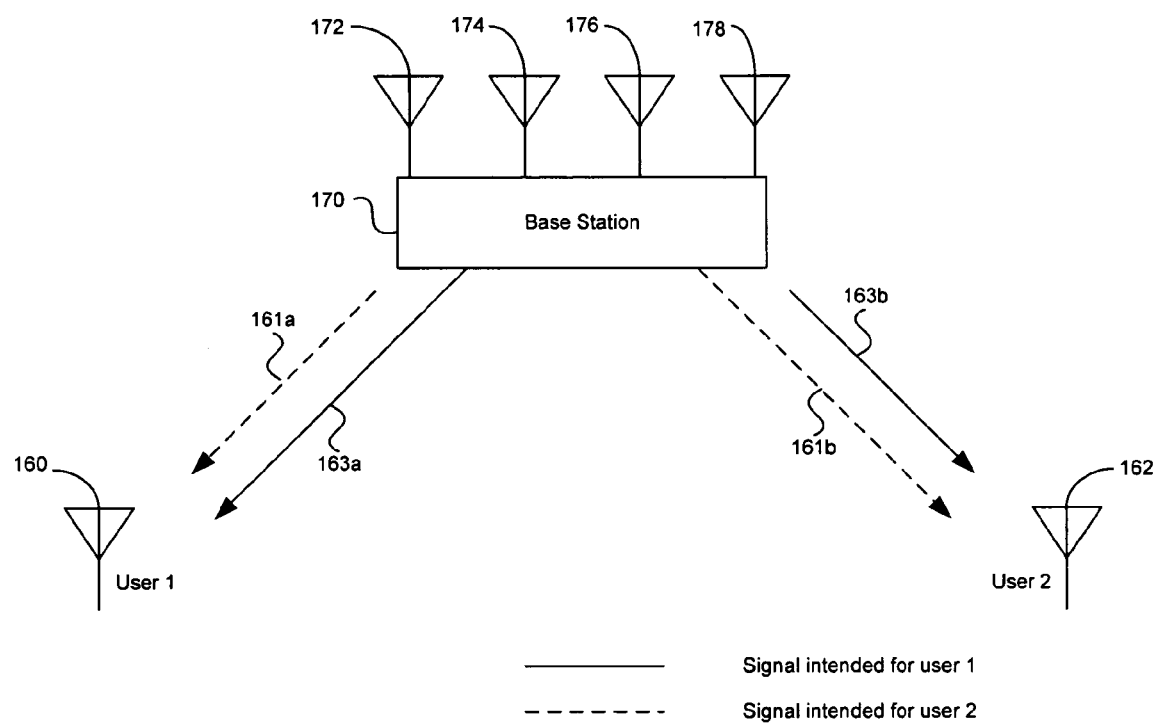
FIG. 1B is a diagram illustrating exemplary signal transmission from the base station to the receivers of FIG. 1B, in accordance with an embodiment of the invention.

FIG. 1B is a diagram illustrating exemplary signal transmission from the base station to the receivers of FIG. 1B, in accordance with an embodiment of the invention. There is shown a base station 170, a first user (user 1) 160, and a second user (user 2) 162. The base station 170 may comprise antennas 152, 154, 156, and 158. The operation of the base station 170 may be substantially similar to the operation of the base station 102a described in FIG. 1A. The operation of the first user 160 and the second user 162 may be substantially similar to the operation of users 122a, ..., 130a in FIG. 1A. In this regard, the first user 160 and the second user 162 may each have a single antenna.

In this instance, the base station 170 may transmit signals 161a, 161b, 163a, and 163b, for example. The signals 161a and 161b may be intended to be received by the second user 162. The signals 163a and 156b may be intended to be received by the first user 160. The first user 160 may receive signals 161a and 163a, where signal 161a was intended for the second user 162. The second user 162 may receive signals 161b and 163b, where signal 163b was intended for the first user 160.

When the base station 170 is equipped with M antennas and there are K users where each user has a single antenna, the signal model may be expressed as:

$$\begin{bmatrix} y_1 \\ y_2 \\ \vdots \\ y_k \end{bmatrix} = \begin{bmatrix} h_1 \\ h_2 \\ \vdots \\ h_k \end{bmatrix} x + n, \quad (1)$$

where $y_k$ (k=1, ..., K) is the signal received by user k, $h^k \in C^{1 \times M}$ is the channel vector to user k, $x \in C^{M \times 1}$ is the transmitted symbol vector by the base station 170, and $n \in C^{K \times 1}$ is the additive white Gaussian noise (AWGN) with zero mean and unit variance. The transmitted symbols may satisfy certain power constraint, for example $E[x^H x] \leq P$ where $(\cdot)^H$ represents a complex conjugate transpose operation.

In this exemplary analysis, each element in $h_k$ may be a zero-mean circularly symmetric complex Gaussian (ZMCSCG) random variable with unit variance. Moreover, the users may experience independent fading and therefore the channel vectors $\{h_\kappa\}_{\kappa=1}^K$ may be statistically independent from each other. The channel state information (CSI), $h_\kappa$ may be known to user k, but may not be known to other user devices. The base station 170 may have knowledge of the CSI for all users. This may occur in a time division duplex (TDD) system where the channel reciprocity may be available or in a frequency divison duplex (FDD) system where CSI feedback may be received by the base station 170 from the users.

Employing multiple antennas at the base station in cellular multiuser communication systems may improve the downlink system capacity. This approach may be utilized with any multiuser MIMO system, such as CDMA2000, WCDMA, and Wireless LAN (WLAN), for example. The capacity improvement may be attained by communicating simultaneously to multiple users through precoding at the transmitter or base station when channel state information is available. In this regard, a transmitter or base station may refer to any device or equipment may be adapted to communicate with multiple other devices, users, and/or receivers. Moreover, user or receiver may refer to user device or equipment that may be adapted for communication with a base station and/or other devices. Dirty paper coding (DPC) may be utilized as a precoding scheme that may achieve the sum capacity, however, it may be difficult to implement due to complexity issues. There may also exist other suboptimal but relatively low complexity schemes for multiuser MIMO downlink, such as linear precoding, Tomlinson-Harashima precoding, and vector encoding, for example.

Recently, it has been shown that zero-forcing (ZF) linear precoder may achieve the sum capacity when combined with infinite-order multiuser diversity, that is, when the number of users K approaches infinity. Moreover, ZF precoders may provide near-optimal performance even with a limited number of users, when K=10 for example. The following discussion addresses the use of zero-forcing precoders in a multiuser environment.

Zero-forcing precoders may be a specific type of linear precoders. When the base station, for example the base station 102a in FIG. 1A, decides to transmit to a group of users $D \subset \{1, \ldots, K\}$ with d=|D|≤K, a linear precoding scheme linearly weighs the data symbols, $s=[s_1, \ldots, S_d]^T$, before they are transmitted from the base station, $$x = FPs, \quad (2)$$

where x is the transmitted signal vector as in equation (1), $F=[f_1, \ldots, f_d]$ is the M×d linear precoding matrix with normalized columns ($\|f_k\|$)=1, and $P=\text{diag}\{P_1, \ldots, P_d\}$ with $\Sigma_{i=1}^d P_i \leq P$ is the power control matrix that allocates transmit power to the different users. The received signal may be given by:

$$\begin{bmatrix} \gamma_1 \\ \gamma_2 \\ \vdots \\ \gamma_d \end{bmatrix} = \begin{bmatrix} h_1 \\ h_2 \\ \vdots \\ h_d \end{bmatrix} FPs + n. \quad (3)$$

A zero-forcing precoder may utilize a pseudo-inverse of the overall channel matrix $H_D = [h_1^T, \ldots, h_d^T]^T$ as the weighting matrix when $H_D$ may have full rank according to the following equation:

$$W_D = H_D^\dagger = H_D^H (H_D H_D^H)^{-1}, \quad (4)$$

$$F_D = W_D \begin{bmatrix} \frac{1}{w_1} & & \\ & \ddots & \\ & & \frac{1}{w_d} \end{bmatrix}, \quad (5)$$

where $\{w_i\}_{i=1}^d$ are the columns of $W_D$.

By defining $$\xi_i \overset{\Delta}{=} \frac{1}{w_i} \qquad (6)$$

and substituting equation (5) into equation (3), the received signal for each user with zero-forcing precoding may be expressed as, $$y_i = \xi_i P_i s_i + n_i, \quad \forall i \in D \qquad (7)$$

In this regard, the multiuser downlink channel may become a set of parallel channels. The maximum sum rate of the given user group D may be given by the following expression:

$$C_D \sum_{i \in D} \log(1 + \xi_i P_i), \qquad (8)$$

where the optimal $P_i$ may be given by the water-filling solution, $$P_i = \left(\mu - \frac{1}{\xi_i}\right)^+ \qquad (9)$$

with the water level $\mu$ chosen to satisfy $$\sum_{i \in D} \left(\mu - \frac{1}{\xi_i}\right)^+ = P.$$

The maximum achievable sum rate for a given channel realization may be obtained by searching over all the possible user groups, that is, $$C = \max_{D \subseteq \{1, \ldots, K\}, |D| \leq M} C_D. \qquad (10)$$

An optimal or best user group selection for ZF precoding may require searching over all $\Sigma_{i=1}^{M}\binom{K}{i}$ candidate user groups to find the one with the largest sum rate, which leads to a fairly high computational cost. Moreover, in an FDD system, all the channel state information that may be needed at the transmitter to perform the optimal user group search may be obtained from the users through a feedback link. Because the optimal search requires CSI from each user and each user's channel is a complex vector of dimension M, that is equivalent to 2M real numbers per user, heavy burden may be placed on the feedback link to obtain this information. This may be particularly cumbersome since the feedback link tends to have very limited capacity. A user group selection scheme that results in a simpler implementation and requires less feedback information may be very useful in multiuser communication systems with multiple transmit antennas.

Figure 2A:
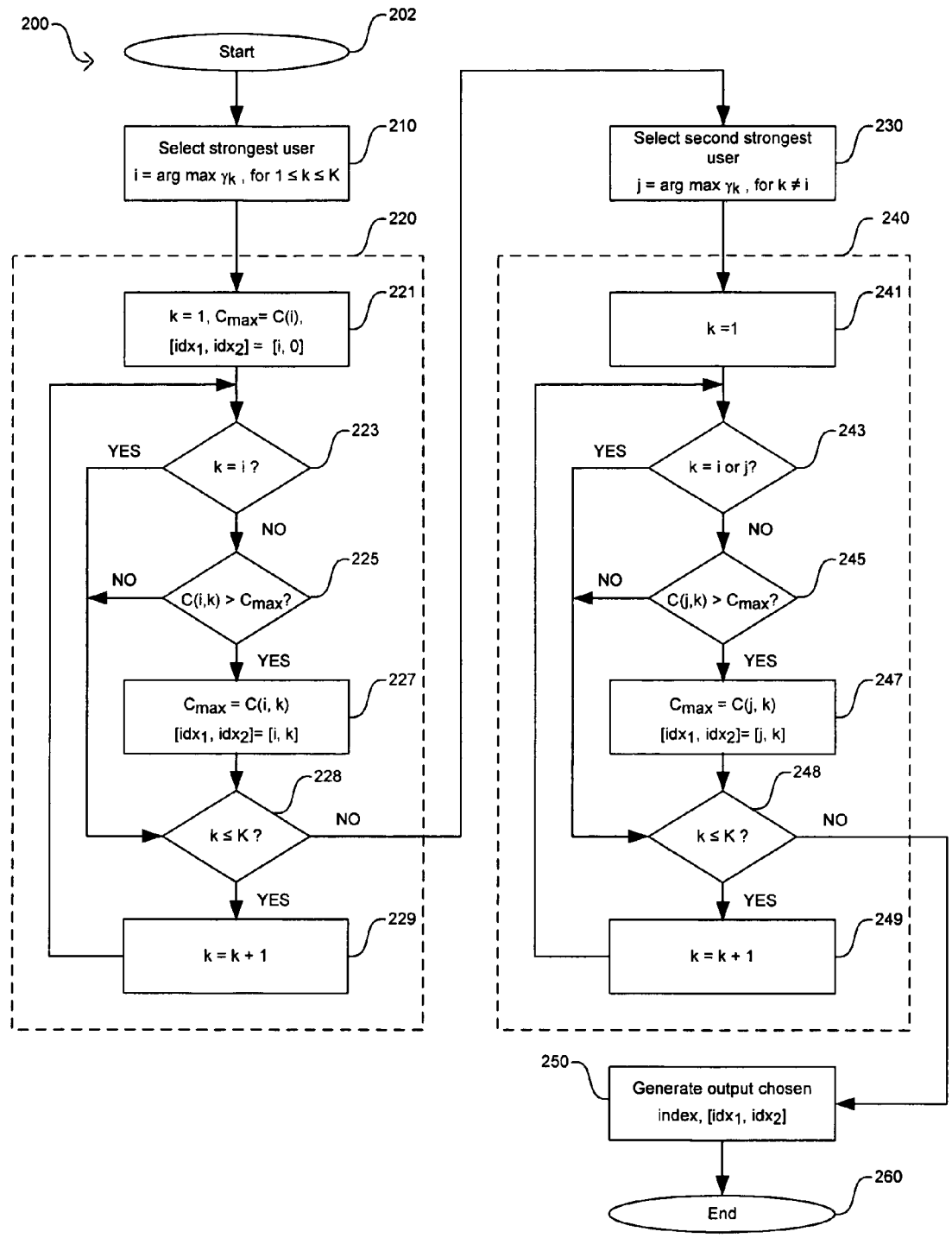
FIG. 2A is a flow diagram illustrating exemplary steps in a double search algorithm for user group selection, in accordance with an embodiment of the invention.

FIG. 2A is a flow diagram illustrating exemplary steps in a double search algorithm for user group selection, in accordance with an embodiment of the invention. Referring to FIG. 2A, there is shown a flow diagram 200 that may correspond to a double search algorithm for user group selection for a communication system where the transmitter is equipped with M=2 antennas. In this regard, the communication system supported by the flow diagram 200 may be a third-generation cellular communication system, such as WCDMA and CDMA200, where two antennas may be typically employed at the base station.

In step 210, after start step 202, the ideal channel state information (CSI) may be available at the base station 102a, for example, from the CSI block 152. In this regard, the multiple-input-single-output (MISO) channel impulse response $h_\kappa \in C^{1 \times 2}$ (M=2) of each of the K users 122a, . . . , 130a may be known at the base station 102a. The strongest user, represented by the index i, may be selected based on the maximum of the channel powers of all the K users 122a, . . . , 130a in the communication system 100, that is, $$i = \arg\max_{1 \leq \kappa \leq K} \gamma_\kappa. \qquad (11)$$

In step 220, the $i^{th}$ user determined in step 210 may be selected as a first candidate to communicate with the base station 102a. In this regard, a first search may be performed in step 220 to determine which of the remaining users may be a second candidate for communication with the base station 102a. In step 221, the maximum system capacity, $C_{max}$, may be initialized to be the rate or capacity supported by having the base station 102a communicate only with the $i^{th}$ user selected in step 210, as given by the expression:

$$C_{max} = C(i) = \log_2(1 + \rho \cdot \gamma_1). \qquad (12)$$

The index $[idx_1, idx_2]$ corresponding to a pair of users or receivers to communicate with the base station 102a may be initialized to [i, 0]. In step 223, a current $\kappa^{th}$ user may be compared to the $i^{th}$ user selected in step 210. When the $\kappa^{th}$ user is the same as the $i^{th}$ user, the search for a second candidate may proceed to step 228. When the $\kappa^{th}$ user is different from the $i^{th}$ user the search for a second candidate may proceed to step 225.

In step 225, the system capacity of communicating to user pair (i,k) may be calculated by the following expression:

$$C(i, k) = \log_2\left(1 + \frac{1}{2}\rho \cdot \gamma_i \cdot a_{i,k}\right) + \log_2\left(1 + \frac{1}{2}\rho \cdot \gamma_\kappa \cdot a_{i,k}\right), \qquad (13)$$

where $\rho$ is the average signal-to-noise ratio (SNR) of the system, and $a_{i,k}$ is a parameter that describes the orthogonality between $h_i$ and $h_k$, $$a_{i,k} = 1 - \frac{|\langle h_i, h_k \rangle|^2}{\|h_i\|^2 \cdot \|h_k\|^2}. \qquad (14)$$

The system capacity in equation (13) may be compared to the maximum system capacity $C_{max}$ obtained thus far. When the system capacity determined in step 225 is lower than the current maximum system capacity, the process may proceed to step 228. When the system capacity determined in step 225 is higher than the current maximum system capacity, the process may proceed to step 227. In step 227, the maximum capacity $C_{max}$ may be updated and the corresponding user pair index [i,k] may be stored.

In step 228, the current user is compared to the total number of users, K, to determine whether the search has exhausted all possible second candidates for communication with the base station 102a. When the search has been exhausted, the process may proceed to step 230. If the search has not been exhausted, the process may proceed to step 229 where the user index value may be increased by one. After step 229, the process may proceed back to step 223 to compare the current $(\kappa+1)^{th}$ user to the $i^{th}$ user selected in step 210.

In step 230, a second strongest user, represented by the index j, or $j^{th}$ user, may be selected from the users that remain after the user with the strongest channel power has been selected. In this regard, the second strongest user may be selected as based on the following expression:

$$j = \underset{k \neq i}{\operatorname{argmax}} y_k. \tag{15}$$

In step 240, the $j^{th}$ user determined in step 230 may be selected as a first candidate to communicate with the base station 102a. In this regard, a second search may be performed in step 240 to determine which of the remaining users may be a second candidate for communication with the base station 102a. In step 241, the current second candidate or user, represented by the index $\kappa$, may be initialized to $\kappa=1$, that is, the index [idx$_1$,idx$_2$] corresponding to a pair of users or receivers to communicate with the base station 102a may be initialized to [i,1]. In this regard, the maximum system capacity, $C_{max}$, may correspond to the maximum system capacity determined in step 227.

In step 243, a current $\kappa^{th}$ user may be compared to the $i^{th}$ and $j^{th}$ user devices selected in steps 210 and 230 respectively. When the $\kappa^{th}$ user is the same as either the $j^{th}$ user or the $i_{th}$ user, the search for a second candidate may proceed to step 248. When the $\kappa^{th}$ user is different from the $j^{th}$ user or the $i^{th}$ user, the search for a second candidate may proceed to step 245.

In step 245, the system capacity of communicating to user pair (j,k) may be calculated by using equation (13). The system capacity in equation (13) may be compared to the maximum system capacity $C_{max}$ obtained so far. When the system capacity determined in step 245 is lower than the current maximum system capacity, the process may proceed to step 248. When the system capacity determined in step 245 is higher than the current maximum system capacity, the process may proceed to step 247. In step 247, the maximum capacity $C_{max}$ may be updated and the corresponding user pair index [j,k] may be stored.

In step 248, the current user is compared to the total number of users, K, to determine whether the search has exhausted all possible second candidates for communication with the base station 102a. When the search has been exhausted, the process may proceed to step 250. When the search has not been exhausted, the process may proceed to step 249 where the user index value may be increased by one. After step 249, the process may proceed back to step 243 to compare the current $(\kappa+1)^{th}$ user to the $i^{th}$ and $j^{th}$ users selected in steps 210 and 230 respectively.

In step 250, the optimal user pair index [idx$_1$,idx$_2$] for communicating with the base station 102a may be determined based on the results from the first search performed in step 220 and the second search performed in step 240.

Figure 2B:
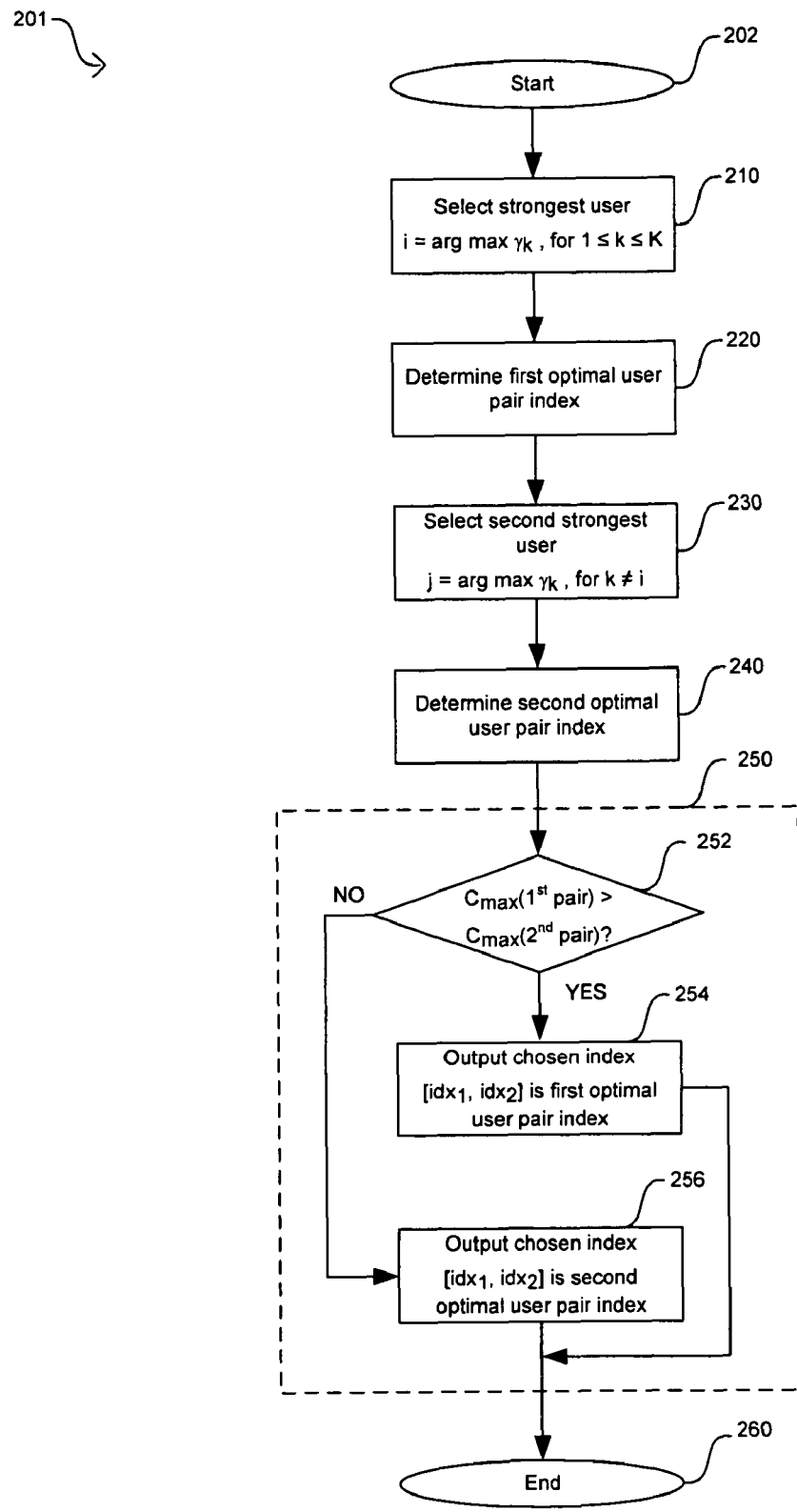
FIG. 2B is a flow diagram illustrating exemplary steps in user pair selection in a double search algorithm for user group selection, in accordance with an embodiment of the invention.

FIG. 2B is a flow diagram illustrating exemplary steps in user pair selection in a double search algorithm for user group selection, in accordance with an embodiment of the invention. Referring to FIG. 2B, there is shown a flow diagram 203 that may correspond to a double search algorithm for user group selection for a communication system where the transmitter is equipped with M=2 antennas. The flow diagram 203 provides additional detail to step 250 in FIG. 2A while steps 210, 220, 230, and 240 may be substantially as described in FIG. 2A.

In step 210, a first candidate for communication with the base station 102a may be selected for a first optimal user group selection search based on the maximum of the channel powers of all the K users 122a, . . . , 130a in the communication system 100 as described by equation (11). In step 220, a second candidate for communication with the base station 102a may be determined based on the maximum capacity that may be achieved for a user pair that comprises the first candidate selected in step 210. The user pair associated with the maximum capacity may be stored. In step 230, a first candidate for communication with the base station 102a may be selected for a first optimal user group selection search based on the maximum of the channel powers of all the remaining K users 122a, . . . , 130a in the communication system 100 as described by equation (15). In step 240, a second candidate for communication with the base station 102a may be determined based on the maximum capacity that may be achieved for a user pair that comprises the first candidate selected in step 230.

After step 240, in step 252, the maximum capacity determined in step 220 may be compared to the maximum capacity determined in step 240. When the maximum capacity determined in step 220 is the greater of the two, the process may proceed to step 254. In step 254, the user pair index [idx$_1$,idx$_2$]=[i,k] associated with the maximum capacity determined in step 220 may be utilized by the base station 102a for transmission. Returning to step 252, when the maximum capacity determined in step 240 is the greater of the two, the process may proceed to step 256. In step 256, the user pair index [idx$_1$,idx$_2$]=[j,k] associated with the maximum capacity determined in step 240 may be utilized by the base station 102a for transmission.

Figure 3:
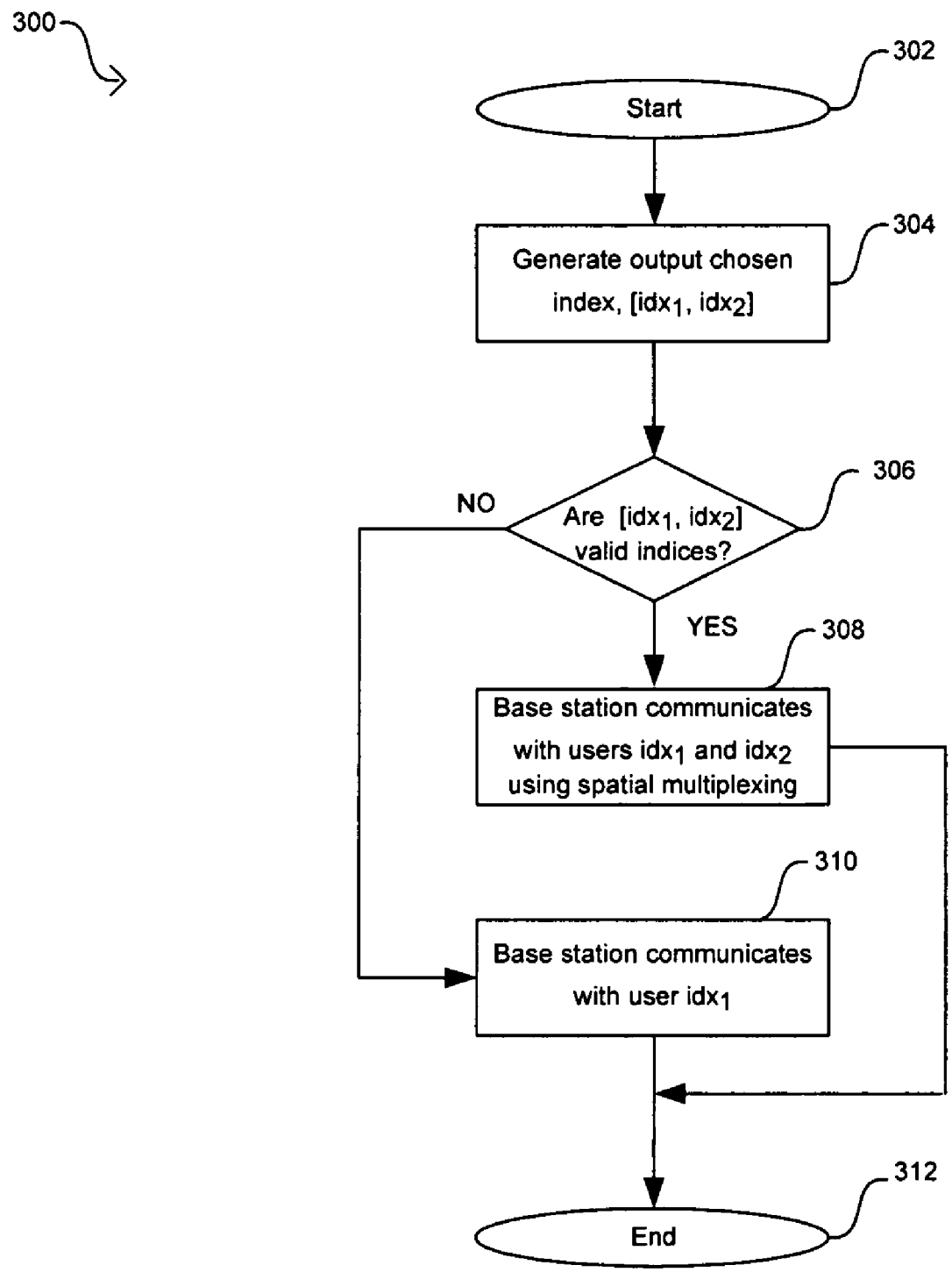
FIG. 3 is a flow diagram illustrating exemplary steps for base station transmission after user group selection, in accordance with an embodiment of the invention.

FIG. 3 is a flow diagram illustrating exemplary steps for base station transmission after user group selection, in accordance with an embodiment of the invention. Referring to FIG. 3, there is shown a flow diagram 300 that may correspond to the base station operation after user group selection as described in FIGS. 2A and 2B. In step 304, after start step 302, based on the result of the double search process an optimal user pair index [idx$_1$,idx$_2$] may be determined. There may be two transmission modes, based on the optimal user pair index, which the base station 102a may utilize.

In step 306, when both idx$_1$ and idx$_2$ correspond to valid indices between 1 and K, the process may proceed to step 308. In step 308, the base station 102a may communicate with both user idx$_1$ and user idx$_2$ at the same time utilizing spatial multiplexing. The transmitter precoding matrix F may be formed by the following expression:

$$F = [\hat{v}_{idx_2}^{\perp H} \; \hat{v}_{idx_1}^{\perp H}]/\sqrt{2}, \tag{16}$$

where vectors $v_{idx1}$ and $v_{idx2}$ are the unit norm directional vectors given by:

$$v_{idx_1} = \frac{h_{idx_1}}{\|h_{idx_1}\|}, \quad v_{idx2} = \frac{h_{idx_2}}{\|h_{idx_2}\|}. \tag{17}$$

The preceding provided in equation (16) may be equivalent to the precoding given by equation (5). After step 308, the process may proceed to end step 312.

TABLE 1

Complexity comparison, where a represents the complexity of comparing two values and b the complexity of computing water-filling solution (b >> a).

|  | Double search algorithm | Brute-force user group selection scheme |
|---|---|---|
| Complexity | $\leq 2Ka$ | $\geq \dfrac{K^2}{2} b$ |

Returning to step 306, when $idx_2$ is equal to 0, the process may proceed to step 310. In step 310, the base station 102a may only communicate with the strongest user, that is user $idx_1$, and may therefore provide better sum capacity by communication with a single user than by using spatial multiplexing, for example. In this instance, the precoding matrix F may be expressed by:

$$F = \hat{v}_{idx_1}^{H}. \quad (18)$$

After step 310, the process may proceed to end step 312.

The approach described herein may be extended to other more sophisticated precoders that may offer better system performance such as the MMSE precoder, the THP precoder, the sphere encoding precoder, for example. When the number of users K is large enough there may be a high probability that two users exist having close to orthogonal channel vectors. In this instance, zero-forcing precoder may be close to an optimal precoder and most preceding techniques may have similar system performance.

A comparison in terms of the search complexity between the brute-force user group selection algorithm and the double search algorithm described herein may be shown in Table 1. The double search algorithm may carry out two searches for a maximum value as described in steps 220 and 240 in FIG. 2A. The first search may be performed among K users, and the second search may be performed among the remaining (K−1) users.

When the complexity of comparing two positive real numbers is represented by variable a, then the complexity of the double search algorithm may be represented by the following expression:

$$\chi \leq 2Ka, \quad (19)$$

as shown in Table 1. As for the optimal group search algorithm, for each of the $$\binom{K}{1} + \binom{K}{2} = \frac{K(K+1)}{2}$$

possible groups, a water-filling solution may have to be calculated in order to obtain the sum rate for each group. When the complexity of computing water-filling solutions is represented by variable b, the complexity of the optimal group selection algorithm may be represented by the following expression:

$$\chi_{opt} \geq \frac{K^2}{2} b. \quad (20)$$

From equations (19) and (20) it may be shown that a<<b and therefore $$\chi \ll \chi_{opt} \quad (21)$$

Figure 4:
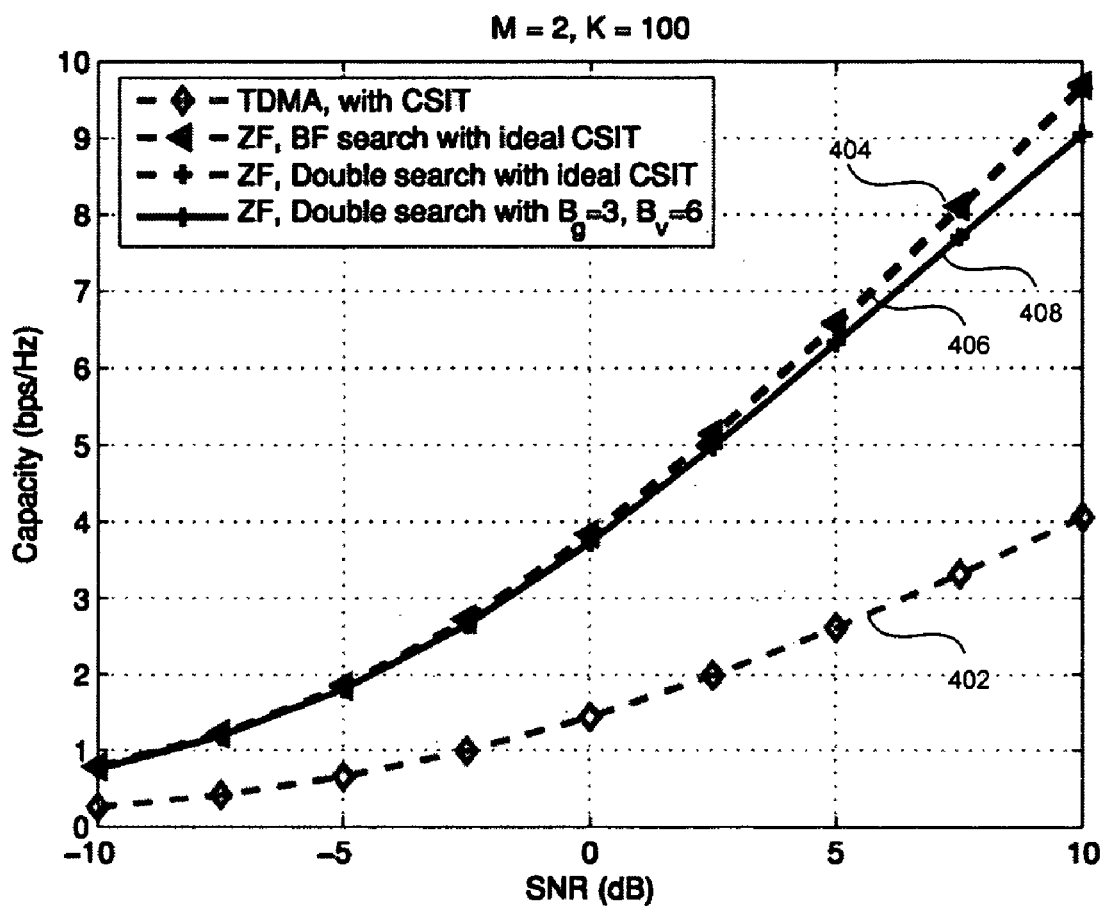
FIG. 4 is a graph that illustrates exemplary downlink transmission schemes in terms of sum rate, in accordance with an embodiment of the present invention.

FIG. 4 is a graph that illustrates exemplary downlink transmission schemes in terms of sum rate, in accordance with an embodiment of the present invention. Referring to FIG. 4, there are shown the results of a numerical simulation corresponding to the sum rate of a cellular system with a single base station and K=100 users. The base station may be equipped with M=2 antennas, for example, and each user may be equipped with a single antenna. The channels are flat Rayleigh faded channels. The transmit antennas at the base station may be spaced or separated so as to experience independent fading. The modulation format applied in this instance may be quadrature phase-shift keying (QPSK), for example.

With reference to FIG. 4, four results are provided. The signal 402 may correspond to the rate sum of a TDMA scheme with channel state information at the transmitter (CSIT). Signal 404 may correspond to the rate sum of a zero-forcing (ZF), brute-force (BF) search with ideal CSIT. The signal 406 may correspond to the rate sum of a ZF, double search scheme with ideal CSIT, in accordance with the various embodiments of the invention. The signal 408 may correspond to the rate sum of a ZF, double search scheme with 3-bits allocated for channel gain feedback ($B_g$=3) and 6 bits allocated for channel directional feedback ($B_v$=6).

The TDMA scheme shown by signal 402 may pick a single user in a round robin fashion and may only transmit to one user at a time using maximum ratio transmission whereas zero-forcing precoding schemes, as described by signals 404, 406, and 408, may communicate to multiple users at a time. Therefore, the zero-forcing preceding schemes may achieve a higher sum rate than the TDMA schemes. The zero-forcing precoding with the optimal brute-force user group selection, signal 404, may exhibit the best performance at the cost of high computational complexity. In accordance with the various embodiments of the invention, signal 406, is able to significantly outperform the TDMA scheme with only limited CSI feedback being utilized. An example of a non-ideal CSIT is provided by signal 408, where 3 bits are allocated for channel gain feedback and 6 bits for channel directional feedback. The system performance of the double search scheme with approximately 49 bits feedback rate may approach the performance of systems with ideal CSIT.

Figure 5:
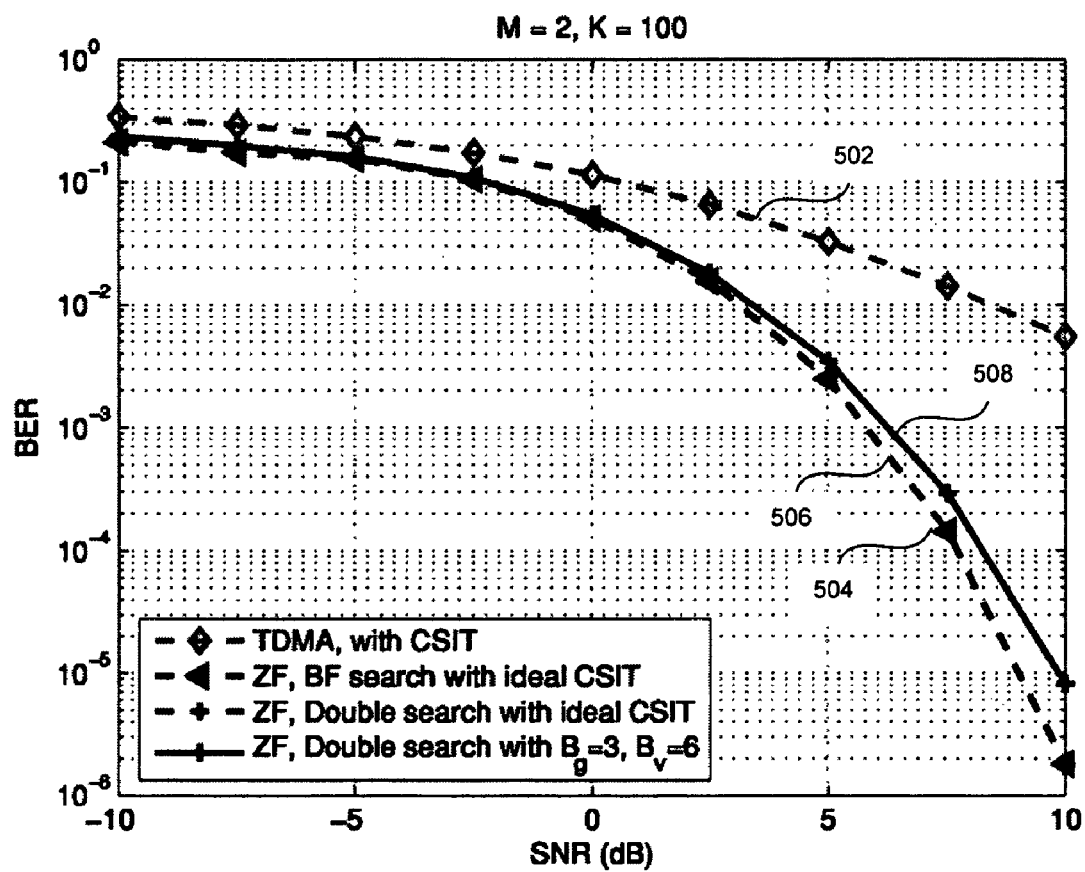
FIG. 5 is a graph that illustrates exemplary downlink transmission schemes in terms of bit error rate, in accordance with an embodiment of the present invention.

FIG. 5 is a graph that illustrates exemplary downlink transmission schemes in terms of bit error rate, in accordance with an embodiment of the present invention. Referring to FIG. 5, there are shown results of a numerical simulation corresponding to the bit error rate (BER) of a cellular system with a single base station and K=100 users. The base station may be equipped with M=2 antennas, for example, and each user may be equipped with a single antenna. The channels are flat Rayleigh faded channels. The transmit antennas at the base station are placed so as to experience independent fading. The modulation format applied in this instance may be QPSK, for example.

With reference to FIG. 5, four results are provided. The signal 502 may correspond to the BER for a TDMA scheme with CSIT. The signal 504 may correspond to the BER of a ZF, BF search with ideal CSIT. The signal 506 may correspond to the BER of a ZF, double search scheme with ideal CSIT, in accordance with the various embodiments of the invention. The signal 508 may correspond to the BER of a ZF, double search scheme with $B_g$=3 and $B_v$=6. The results for the BER performance between the signals 502, 504, 506, and 508 are substantially the same as the results for signals 402, 404, 406, and 408 shown for the rate sum in FIG. 4.

The double search user group selection algorithm in a MIMO multiuser downlink environment described herein may reduce the computational complexity compared to the brute-force user selection algorithm. In this regard, the complexity may be reduced from about $K^2/2$ to $2K(K>>2)$, for example, where K represents the number of users. In accordance with various embodiments of the invention, the double search user group selection algorithm may outperform the TDMA scheme as well as the semi-orthogonal user group selection algorithm and achieve performance in terms of capacity and BER close to systems with optimal brute-force user group selection algorithm. Moreover, the invention may be extended to more sophisticated precoders that offer better system performance, such as a minimum mean square error (MMSE) precoder, a Tomlinson-Harashima precoder (THP), and a sphere encoding precoder, for example.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
    performing by one or more processors and/or circuits, functions comprising:
        selecting, from a plurality of signals, a first signal corresponding to a channel gain that is greater than a channel gain corresponding to a remaining portion of said plurality of signals;
        selecting, from said remaining portion of said plurality of signals, a second signal corresponding to a channel gain that is greater than a channel gain corresponding to a remaining portion of said remaining portion of said plurality of signals; and
        maximizing a downlink system capacity based on said selected first signal and said selected second signal.

2. The method according to claim 1, said functions comprising maximizing a first system capacity based on said channel gain corresponding to said selected first signal.

3. The method according to claim 2, said functions comprising selecting a first pair of receivers associated with said maximized first system capacity.

4. The method according to claim 1, said functions comprising maximizing a second system capacity based on said channel gain corresponding to said selected second signal.

5. The method according to claim 4, said functions comprising selecting a second pair of receivers associated with said maximized first system capacity.

6. The method according to claim 1, said functions comprising maximizing said downlink system capacity based on a greater of a maximized first system capacity and a maximized second system capacity.

7. The method according to claim 6, said functions comprising selecting a pair of receivers that provide said maximized downlink system capacity.

8. A non-transitory computer-readable storage medium having stored thereon, a computer program having at least one code section for processing signals in a communication system, the at least one code section being executable by a computer system for causing the computer system to perform steps comprising:
    selecting, from a plurality of signals, a first signal corresponding to a channel gain that is greater than a channel gain corresponding to a remaining portion of said plurality of signals;
    selecting, from said remaining portion of said plurality of signals, a second signal corresponding to a channel gain that is greater than a channel gain corresponding to a remaining portion of said remaining portion of said plurality of signals; and
    maximizing a downlink system capacity based on said selected first signal and said selected second signal.

9. The non-transitory computer-readable storage medium according to claim 8, wherein said at least one code section comprises code for maximizing a first system capacity based on said channel gain corresponding to said selected first signal.

10. The non-transitory computer-readable storage medium according to claim 9, wherein said at least one code section comprises code for selecting a first pair or receivers associated with said maximized first system capacity.

11. The non-transitory computer-readable storage medium according to claim 8, wherein said at least one code section comprises code for maximizing a second system capacity based on said channel gain corresponding to said selected second signal.

12. The non-transitory computer-readable storage medium according to claim 11, wherein said at least one code section comprises code for selecting a second pair or receivers associated with said maximized first system capacity.

13. The non-transitory computer-readable storage medium according to claim 8, wherein said at least one code section comprises code for maximizing said downlink system capacity based on a greater of a maximized first system capacity and a maximized second system capacity.

14. The non-transitory computer-readable storage medium according to claim 13, wherein said at least one code section comprises code for selecting a pair of receivers that provide said maximized downlink system capacity.

15. A system for processing signals in a communication system, the system comprising:
    one or more circuits that are operable to select, from a plurality of signals, a first signal corresponding to a channel gain that is greater than a channel gain corresponding to a remaining portion of said plurality of signals;
    said one or more circuits are operable to select, from said remaining portion of said plurality of signals, a second signal corresponding to a channel gain that is greater than a channel gain corresponding to a remaining portion of said remaining portion of said plurality of signals; and
    said one or more circuits are operable to maximize a downlink system capacity based on said selected first signal and said selected second signal.

16. The system according to claim 15, wherein said one or more circuits are operable to maximize a first system capacity based on said channel gain corresponding to said selected first signal.

17. The system according to claim 16, wherein said one or more circuits are operable to select a first pair of receivers associated with said maximized first system capacity.

18. The system according to claim 15, wherein said one or more circuits are operable to maximize a second system capacity based on said channel gain corresponding to said selected second signal.

19. The system according to claim 18, wherein said one or more circuits are operable to select a second pair of receivers associated with said maximized first system capacity.

20. The system according to claim 15, wherein said one or more circuits are operable to maximize said downlink system capacity based on a greater of a maximized first system capacity and a maximized second system capacity.

21. The system according to claim 20, wherein said one or more circuits are operable to select a pair of receivers that provides said maximized downlink system capacity.

22. The system according to claim 15, wherein said one or more circuits comprises at least one or both of: a scheduler and/or a processor.

* * * * *

UNITED STATES PATENT AND TRADEMARK OFFICE
CERTIFICATE OF CORRECTION

| | | |
|---|---|---|
| PATENT NO. | : 7,899,421 B2 | Page 1 of 1 |
| APPLICATION NO. | : 11/231501 | |
| DATED | : March 1, 2011 | |
| INVENTOR(S) | : Zheng et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this
Eleventh Day of October, 2011

David J. Kappos
*Director of the United States Patent and Trademark Office*